United States Patent [19]

Ishida

[11] Patent Number: 4,497,562
[45] Date of Patent: Feb. 5, 1985

[54] EXPOSURE CONTROL DEVICE FOR FLASH PHOTOGRAPHY

[75] Inventor: Tokuji Ishida, Daito, Japan

[73] Assignee: Minolta Camera Kabushiki Kaisha, Osaka, Japan

[21] Appl. No.: 530,574

[22] PCT Filed: Dec. 23, 1982

[86] PCT No.: PCT/JP82/00475
§ 371 Date: Aug. 24, 1983
§ 102(e) Date: Aug. 24, 1983

[30] Foreign Application Priority Data

Dec. 25, 1981 [JP] Japan ................... 56-210354

[51] Int. Cl.³ .................................. G03B 15/05
[52] U.S. Cl. ........................ 354/416; 354/443
[58] Field of Search ............... 354/413–418, 354/420–422, 441–443

[56] References Cited

U.S. PATENT DOCUMENTS

| 3,601,022 | 8/1971 | Langnau | 354/416 |
|---|---|---|---|
| 3,836,920 | 9/1974 | Uchiyama et al. | 354/414 |
| 4,047,194 | 9/1977 | Nakamura et al. | 354/416 |
| 4,367,023 | 1/1983 | Ishida et al. | 354/415 |
| 4,367,932 | 1/1983 | Ishikawa et al. | 354/416 |
| 4,423,936 | 1/1984 | Johnson | 354/415 X |

FOREIGN PATENT DOCUMENTS

| 2520449 | 11/1975 | Fed. Rep. of Germany . |
|---|---|---|
| 1797079 | 2/1976 | Fed. Rep. of Germany . |
| 48-85226 | 11/1973 | Japan . |
| 50-147938 | 11/1975 | Japan . |
| 54-158923 | 12/1979 | Japan . |
| 56-60419 | 5/1981 | Japan . |
| 107224 | 8/1981 | Japan | 354/416 |
| 56-99324 | 8/1981 | Japan . |
| 57-48719 | 3/1982 | Japan . |
| 1218639 | 1/1971 | United Kingdom . |

OTHER PUBLICATIONS

IBM Technical Disclosure Bulletin, vol. 12, No. 6, Nov., 1969, p. 853.

Primary Examiner—William B. Perkey
Attorney, Agent, or Firm—Watson Cole Grindle & Watson

[57] ABSTRACT

An exposure control device for flash photography using a first program signal circuit 5 for generating signals representative of a shutter speed and a diaphragm aperture value for flash photography and which is determined in accordance with the output of a light measuring circuit 2 that measure the brightness of a scene to be photographed, namely, the light measurement value, and with a full aperture value of the objective lens; a second program signal circuit for generating signals representative of a shutter speed and a diaphragm aperture for flash photography and determined in accordance with the output from a range finding circuit and the maximum amount of light to be emitted from the flash device in use; and a third program signal circuit for generating signals representative of a shutter speed and a diaphragm aperture for flash photography and in compliance with the output from the range finding circuit and the minimum amount of light to be emitted from the flash device in use; and wherein one of the output signals of those three programmed signal circuits is selected based on the results of a comparison of the output signals and used for camera exposure control.

4 Claims, 7 Drawing Figures

EXPOSURE CONTROL DEVICE FOR FLASH PHOTOGRAPHY

FIELD OF THE INVENTION

The present invention relates to a photographic camera provided with a programmed exposure control circuit which controls the diaphragm aperture and the shutter speed in accordance with a camera-to-object distance and an object brightness when the camera is set to the flash photography mode.

BACKGROUND OF THE INVENTION

In a conventional camera, the objective lens diaphragm aperture and the shutter speed for flash photography were controlled in such a manner that the diaphragm aperture is controlled depending upon the camera-to-object distance, for instance, to F 5.6 when the object is near from the camera and F 2.8 when the object is at a distance from the camera respectively, and that the shutter speed is controlled to approximately 1/60 second which is the highest flash synchronizable speed. In other known flash photography exposure control system, a range finding device incorporated in the camera measures the camera-to-object distance prior to the exposure and the diaphragm aperture is controlled in accordance with the mesured distance, with the shutter speed being adjusted to the highest flash synchronizable speed.

However, in such exposure control systems, the ambient light and the brightness condition of the portions other than the principal target object in the objective scenery were not taken into account. When a picture is taken for a scene where a person to be photographed stands in a dark scenery, although a proper amount of exposure is given to the person as the principal object which is illuminated by the flash light, the diaphragm aperture and the shutter speed at that time can not give sufficient exposure for the surroundings of the principal object because they are ordinarily further away from the camera than the principal object and receives little amount of flash light. As the result, the surrounding are reproduced dark in the resultant picture with the principal object having been photographed with a proper exposure.

DISCLOSURE OF THE INVENTION

The present invention has been made to dissolve the above described problem and its object is to provide an exposure control device for a camera which can provide, even in the case of flash photography, pictures showing the brightness of the object and its background that have a relationship virtually the same as that of the actual scenes.

Another object of the present invention is to provide an exposure control device for a camera which selects diaphragm aperture value for the exposure control, depending upon the relationship between the diaphragm aperture value for use in the flash photography determined based on the light measurement and the full aperture value of the objective lens and the diaphragm aperture value determined by the maximum or minimum available amount of flash light of the flash device and the camera-to-object distance.

The present invention comprises:
(i) A first programmed exposure control circuit which generates a signal for indicating a combination of a first diaphragm aperture value and a shutter speed calculated from the data of the light measurement of the ambient light an the full aperture value and adapted to provide a required exposure level for the ambient light;
(ii) A second programmed exposure control circuit which generates a signal for indicating a combination of a second diaphragm aperture value and a shutter speed calculated from the maximum amount of light to be emitted from the flash device, the camera-to-object distance and the light measurement and adapted to provide a required exposure level for the ambient light;
(iii) A third programmed exposure control circuit which indicates a combination of a third diaphragm aperture and a shutter speed combination calculated from the minimum amount of flash light to be emitted from the flash device, the camera-to-object distance and the light measurement and adapted to provide a required exposure level as mentioned above for the ambient light.

Upon determination of a diaphragm aperture value and a shutter speed for flash photography the present invention compares the above first, second, and third diaphragm aperture values with one another for selecting an optimum combination from the above three kinds of combinations of the diaphragm aperture and shutter speed such that the diaphragm aperture and shutter speed of the camera can be controlled in accordance with the selected combination, thereby providing photographic pictures with the relationship of the brightness between the object and its background being substantially the same as that of the actual scene taken with the flash device.

According to the present invention, upon flash photography, a diaphragm aperture value is calculated based on the ambient light, the camera-to-object distance and the amount of flash light. Those calculated diaphragm aperture values are compared with required conditions to determine the diaphragm aperture value of the camera in accordance with the result of the comparison. Hence, the invention prevents photographic pictures taken with flash light from having an unduly dark image of a background in contrast with a bright image of a principle object. Thus the invention provides pictures with a brightness relationship between the object and its background which is substantially the same as that of the lighting conditions with the flash being not fired.

THE MOST PREFERRED FORM FOR EMBODYING THE INVENTION

Figure 1:
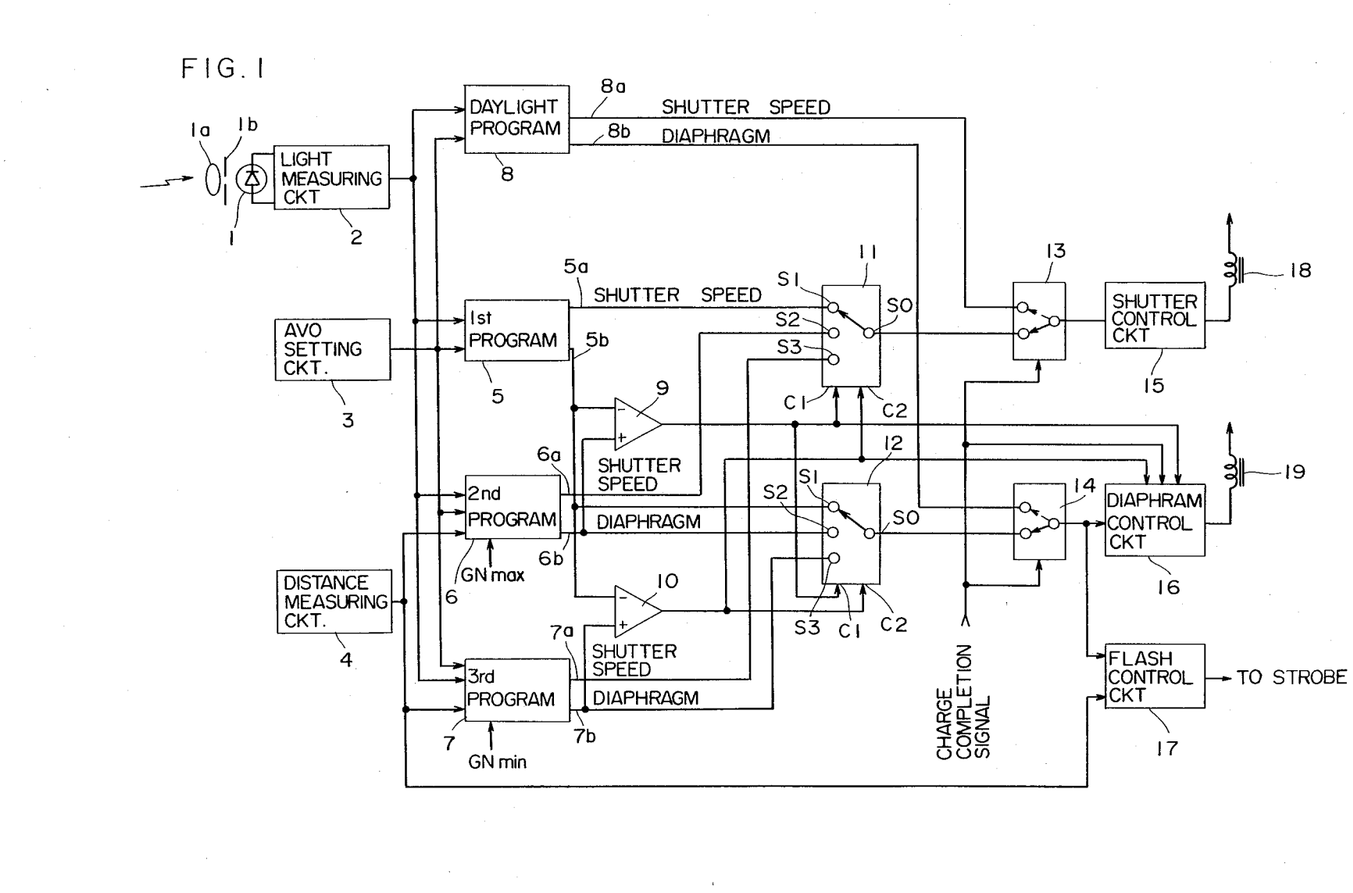
FIG. 1 is a block diagram showing an embodiment of the present invention.

With reference to FIG. 1, photocell 1 is, for example disposed within the camera body to receive light reflected from an object to be photographed, and passing through the aperture of diaphragm 1b of the objective lens 1a of a single lens reflex camera. The photocell 1 is connected to light measuring circuit 2. Light measuring circuit 2 generates a voltage commensurate with an object brightness. Full aperture value setting circuit 3 generates an output voltage commensurate with a full aperture value of the taking lens. Range finding circuit 4 measures the distance between the camera and the object, i.e. an object distance, and generates an output voltage commensurate with the object distance. Natural light photography programmed exposure control circuit 8 may be arranged for example, as disclosed in the U.S. Pat. No. 4,329,035 such that it receives signals corresponding to a light measurement value from light measuring circuit 2 and a full aperture value from full aperture value setting circuit 3, respectively, and that it generates, from output terminals 8a and 8b, voltages corresponding to an aperture value Av and shutter speed value Tv1 of the combination that has been programmed for providing a proper exposure level in accordance with an object brightness. First flash photography programmed exposure control circuit 5 receives voltages corresponding to a light measurement value from light measuring circuit 2, and a full aperture value from full aperture value setting circuit 3 respectively, to generate, from output terminals 5b and 5a respectively, voltages corresponding to the full aperture value Av2 and a shutter speed value Tv2 of the combination that is programmed to obtain an exposure level determined in accordance with the brightness of the surrounding objects. The second flash photography programmed exposure control circuit 6 receives voltages respectively corresponding to the light measurement value from light measuring circuit 2, the full aperture value from full aperture value setting circuit 3 and the object distance from range finding circuit 4, and in addition, receives data GN max representative of the maximum amount of the flash light to be emitted from the flash device. The second flash photography exposure control circuit generates, from output terminals 6b and 6a, voltages respectively corresponding to the proper-exposure-presentable maximum aperture value Avmax, which is automatically determined in accordance with the maximum amount of flash light to be emitted and with the object distance, and corresponding to a shutter speed Tv3 which can provide an exposure of a required level only with the ambient light. It is to be noted that the maximum amount of flash light means the amount of flash light to be emitted from the flash tube when the flash device has fired the flash tube until the electric charge in the main capacitor is substantially fully discharged.

The third flash photography programmed exposure control circuit receives voltages respectively corresponding to the light measurement value from light measuring circuit 2, the full aperture value from full aperture value setting circuit 3, and a camera-to-object distance from range finding circuit 4. The third control circuit also receives data GNmin that represents the minimum amount of flash light to be provided by the flash device being used. Thus, the third control circuit generates, from output terminals 7b and 7a, voltages corresponding to the proper-exposure-providable minimum aperture value Av min, which is to be determined automatically in accordance with the minimum amount of flash light to be emitted and the object distance, and corresponding to the shutter speed Tv4, which can provide an exposure of a required level with only the ambient light. It is to be noted that flash photography programmed control circuits 5, 6 and 7 generate signals corresponding to a flash synchronizable shutter speed (slower than 1/60 sec.) in compliance with their respective programs. It is also to be noted that the minimum amount of flash light means a controllable minimum flash light amount which will be determined by the capacitance of the commutation capacitor for the interruption of the flash firing and by the response time of the flash light stopping circuit, etc.

First comparator circuit 9 receives a voltage corresponding to the aperture value Av2 and generated from the first flash photography programmed exposure control circuit 5 and a voltage corresponding to the aperture value Avmax and generated from the second flash photography programmed exposure control circuit 6 and compares both inputs. Second comparator circuit 10 receives a voltage corresponding to the aperture value Av2 and generated from first flash photography programmed exposure control circuit 5 and a voltage corresponding to the aperture value Avmin and generated from third flash photography programmed exposure control circuit 7 to compare both the inputs.

First shutter speed selecting circuit 11 selectively outputs one of the three input voltages supplied from flash photography programmed exposure control circuits 5, 6 and 7 and corresponding to respective shutter speeds given thereby, the selection being made in accordance with the outputs which are supplied from comparator circuits 9 and 10 and which are input as the control signals. First diaphragm aperture selecting circuit 12 selectively outputs one of the three input voltages supplied from flash photography programmed exposure control circuit 5, 6 and 7 and corresponding to respective diaphragm aperture values given thereby, the selection being made in accordance with the outputs which are supplied from comparator circuits 9 and 10 and which are input as control signals.

Second shutter speed selecting circuit 13 may be arranged, for example, as disclosed in the U.S. Pat. No. 4,311,371 and operates such that when a charge-completion signal showing the completion of charge of the main capacitor is input from the flash device (not shown), second shutter speed selecting circuits 13 outputs a voltage which corresponds to shutter speed for flash photography and which is input from the first shutter speed selecting circuit 11. When no charge-completion signal is supplied, second shutter speed selecting circuit 13 outputs the voltage which is input from natural light photography programmed exposure control circuit 8 and which corresponds to a shutter speed Tv1 for natural light photography. The output of second shutter speed selecting circuit 13 is applied to shutter speed control circuit 15, the output of which is connected to electromagnet 18 for the shutter closure. Thus, the shutter is controlled to the shutter speed in compliance with the output voltage of second shutter speed selecting circuit 13.

When a charge completion signal is applied from the flash device, second diaphragm selecting circuit 14 generates the voltage supplied from first diaphragm selecting circuit 12 and corresponding to a diaphragm aperture value for flash photography.

When no charge-completion signal is applied, second diaphragm aperture selecting circuit 14 generates an output voltage input from natural light photography programmed exposure control circuit 8 and corresponding to a diaphragm aperture value Av1, for natural light photography. The output of second diaphragm aperture selecting circuit 14 is input to diaphragm control circuit 16. The diaphragm aperture is controlled by diaphragm control electromagnet 19 to provide an exposure of a prescribed level to be described later for the surrounding object. The actual operation of this diaphragm control circuit 16 will be described later.

The output of second diaphragm aperture selecting circuit 14 is also input to emitted flash light amount control circuit 17, which generates voltage corresponding to an amount of flash light that is necessary for obtaining an optimum exposure, the voltage depending on the output of range finding circuit 4 which is also input to flash light control circuit 17. The voltage generated from flash light control circuit 17, corresponding to an amount of light emitted from the flash tube, is transmitted to the flash device (not shown) in which the flash light is controlled to an amount commensurate with the output of flash light control circuit 17.

Now let reference numerals S1, S2 and S3 represent input terminals of the first shutter speed selecting circuit 11 and the first diaphragm aperture selecting circuit 12, and the reference numerals C1 and C2 represent control input terminals of the same as shown in the Figure. Both selecting circuits are designed to produce outputs as shown in Table 1 at their respective output terminals $S_0$ depending upon whether the input voltages to terminals C1 and C2 are at a logic high level, "H" or low level state "L".

TABLE 1

| C1 | C2 | S0 |
|---|---|---|
| L | L | S2 |
| H | L | S1 |
| H | H | S3 |

Consequently, signals representing a diaphragm aperture value and a shutter speed shown below will be generated from selecting circuits 11 and 12 in accordance with the relationship of levels among the diaphragm aperture value $AV_2$ provided from first programmed exposure control circuit 5, the maximum diaphragm aperture value AVmax provided from second programmed exposure control circuit 6 and the minimum diaphragm aperture value AVmin provided from the third programmed exposure control circuit 7.

(i) Where Av2>Avmax, the output signals of both the first comparator circuit 9 and the second comparator circuit 10 are at low levels "L". At this time, first shutter speed selecting circuit 11 and first diaphragm aperture selecting circuit 12 are switched to terminals S2. First shutter speed selecting circuit 11 generates an output signal corresponding to the shutter speed Tv3 calculated in second programmed exposure control circuit 6. On the other hand, first diaphragm aperture selecting circuit 12 generates an output signal corresponding to the diaphragm aperture value AVmax calculated in second programmed exposure control circuit 6.

(ii) Also, where Avmax>Av2>Avmin, the output signal of the first comparator circuit 9 is at a high level "H" while the output signal of second comparator circuit 10 is at a low level "L". At this time, each of selecting circuits 11 and 12 is switched to terminal S1. First shutter speed selecting circuit 11 generates an output signal corresponding to the shutter speed Tv2 calculated in first programmed exposure control circuit 5, and similarly first diaphragm aperture selecting circuit 12 generates an output signal corresponding to the diaphragm aperture value Av2 calculated first programmed exposure control circuit 5.

(iii) Next, where Avmin>Av, the output signals from both first and second comparator circuits 9 and 10 are at high levels "H" and at this time, each of selecting circuits 11 and 12 is switched to terminal S3. First shutter speed selecting circuit 11 generates an output signal corresponding to the shutter speed Tv4 calculated in third programmed exposure control circuit 7. Similarly, first diaphragm aperture selecting circuit 12 generates an output signal corresponding to the diaphragm aperture value Avmin calculated in third programmed exposure control circuit 7.

Also, when a picture is taken with flash light, the second shutter speed selecting circuit 13 and the second diaphragm aperture selecting circuit 14 are switched to the conditions as shown by the real line upon receipt of a charge-completion signal by the camera. Therefore, the output of first shutter speed selecting circuit 11 is applied to the shutter speed control circuit 15 via selecting circuit 13, and the output from the first diaphragm aperture selecting circuit 12 is applied through second diaphragm selecting circuit 14, second diaphragm selection circuit 16 and emitted flash light amount control circuit 17.

Thus the shutter and the diaphragm aperture of the camera are set to a speed and a size depending on the conditions as the above described cases (i), (ii) and (iii).

It is to be noted that when the flash device is not used, no charge completion signal is supplied to the camera, and that both second shutter speed selecting circuit 13 and second diaphragm aperture selecting circuit 14 are held in the conditions as shown by the dotted lines. Therefore, at this time, the shutter speed and the diaphragm aperture value of the camera are set to the shutter speed Tv1 and the diaphragm aperture value Av1 calculated by natural light photography programmed exposure control circuit 8.

Figure 2:
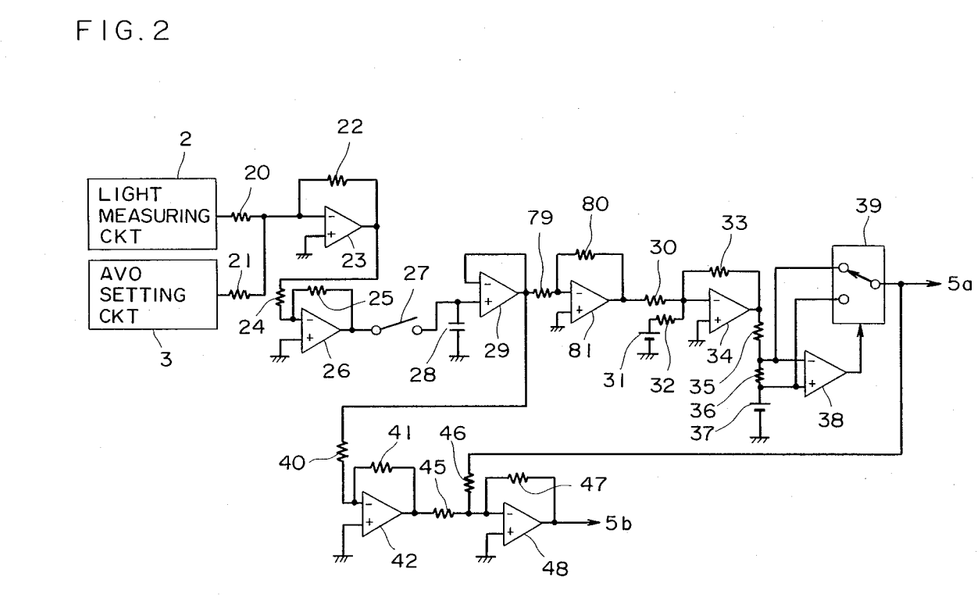
FIG. 2 is a circuit diagram showing an example of the first programmed exposure control circuit 5 of the embodiment.

FIG. 2 is a circuit diagram showing an example of the first flash photography programmed exposure control circuit 5 shown in FIG. 1.

With reference to FIG. 2, operational amplifier 23 receives the outputs of light measuring circuit 2 and full aperture value setting circuit 3 via resistors 20 and 21. Light measuring circuit 2 also receives the set film sensitivity value (not shown). Assuming that the apex value of the full aperture value of the objective lens being used is Av0, light measuring circuit 2 generates an output voltage corresponding to "Bv+Sv−Av0", in the full aperture light measuring condition. Also, operational amplifier 23, at this time, receives a voltage corresponding to Av0 from full aperture setting circuit 3. The outputs from light measuring circuit 2 and full aperture setting circuit 3 are processed for the calculation by resistors 20, 21, 22, 24 and 25, and operational amplifiers 23 and 26. Operational amplifier 26 generates an output voltage corresponding to "BV+Sv". Switch 27 is opened immediately before the start of stopping-down of the diaphragm of the camera objective lens. The output voltage of operational amplifier 26 is stored by storage capacitor 28 via switch 27, and the stored signals are transmitted via buffer circuit 29.

An ordinary programmed exposure control circuit is designed such that both the diaphragm aperture value and the shutter speed are increased at a given rate with the increment of the "Bv+Sv" value. Assuming that the value of the "Bv+Sv" becomes Ev1 with the shutter speed increasing at the given rate becomes a marginal flash synchronizable shutter speed (for example 1/60 sec.) from low speeds, and that the apex value of the marginal flash synchronizable shutter speed is Tvmax, a voltage corresponding to a diaphragm aperture value given by "Ev1−Tvmax" is provided by constant voltage source 31. Calculation is performed with the outputs from buffer circuit 29 and constant voltage source 31, by the circuit including a constant voltage course 31, resistors 79, 80, 30, 32 and 33 and operational amplifiers 81 and 34. Operational amplifier 34 generates an output voltage corresponding to a shutter speed, given by "Bv+Sv−Ev1+Tvmax". On the other hand, constant voltage source 37 generates an output voltage corresponding to the marginal flash synchronizable shutter speed Tvmax and the voltage difference between the output of constant voltage source 37 and that of operational amplifier 34 is divided in the ratio determined by resistors 35 and 36, so that an output voltage corresponding to the shutter speed changing as a function of the object brightness will be generated at the point A.

Both the voltage at point A and the output voltage of constant voltage source 37 are input to shutter speed selecting circuit 39. Comparator circuit 38, which also receives the above two voltages, generates an output for controlling shutter speed selecting circuit 39 and determining which one of the two voltages will be output from the latter circuit 39. When the voltage at point A is higher than that of constant voltage source 37, namely, when the shutter speed corresponding to the voltage of the point A is higher than the marginal flash synchronizable shutter speed, shutter speed selecting circuit 39 will output a voltage from constant voltage source 37, i.e., the voltage corresponding to the marginal flash synchronizable shutter speed. When the voltage at the point A is lower than that of constant voltage source 37, in other words, when the voltage at point A corresponds to a shutter speed slower than the marginal flash synchronizable shutter speed, shutter speed selecting circuit 39 will output the voltage at the point A. Thus a voltage corresponding to a shutter speed Tv1 that is synchronizable with the flash system is output from shutter speed selecting circuit 39 via terminal 5a. Calculation is performed with the outputs from buffer circuit 29 and shutter speed selecting circuit 39 by resistors 40, 41, 44, 45, 46 and 47 and operational amplifiers 42 and 48, and a voltage corresponding to "Bv+Sv−Tv", namely Av, is output from operational amplifier 48. The voltage is output from terminal 5b as diaphragm aperture value Av2 that provides a proper exposure for the ambient light.

Figure 3:
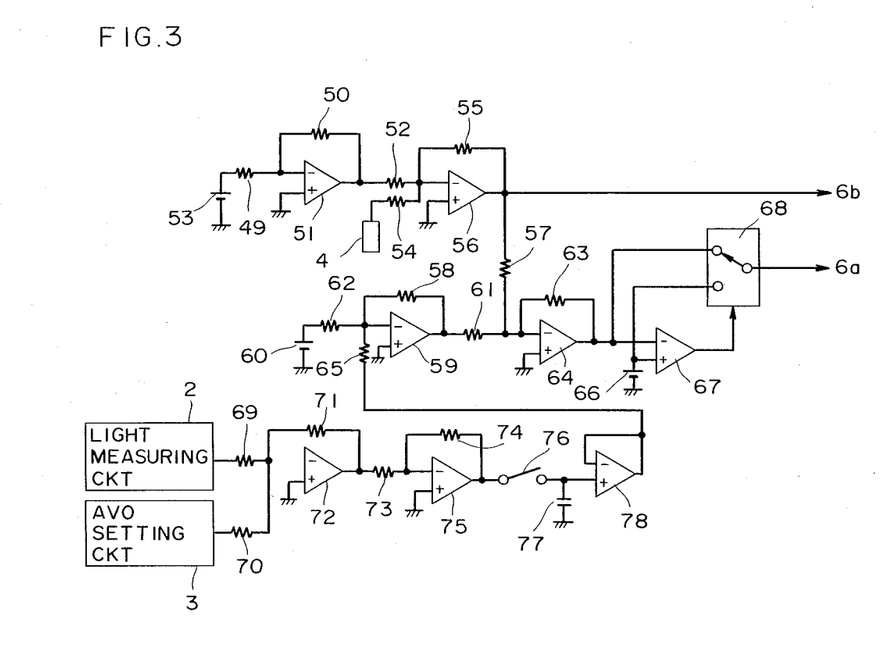
FIG. 3 is a circuit diagram showing an example of the second programmed exposure control circuit 6 of the embodiment.

FIG. 3 shows one example of second programmed flash photography exposure control circuit 6 shown in FIG. 1.

With reference to FIG. 3, operational amplifier 56 receives an output from range finding circuit 4 via resistor 54. Let the APEX value of the camera-to-object distance be denoted by Dv. The set film sensitivity data (not shown) is also input to range finder circuit 4. If the film sensitivity is represented by Sv, range finding circuit 4 generates an output voltage corresponding to "Dv−Sv." Assuming that the APEX value of the maximum flash light amount of the flash device is Ivmax, a voltage corresponding to Ivmax is output by constant voltage source 53. Calculation is performed with the outputs from constant voltage source 53 and range finding circuit 4 by resistors 49, 50, 52, 54 and 55 and operational amplifiers 51 and 56, and operational amplifier 56 generates an output voltage corresponding to "Ivmax+Sv−Dv." Thus, from terminal 6b is generated an output voltage corresponding to the controlled diaphragm aperture value Av3 which is automatically determined from the aforementioned data. Also, operational amplifier 78 generates an output voltage corresponding to "Bv+Sv" similar to the output of operational amplifier 29 shown in FIG. 2.

Constant voltage source 60 serves to set the difference of the exposure level to be given to the surroundings of a target object. Assume that the number of steps to be shifted to "under" exposure is a. Then, calculation is performed with the outputs from operational amplifier 56, constant voltage source 60 and operation amplifier 78 by resistors 57, 58, 61, 62, 63 and 65 and operational amplifiers 59 and 64. At this time, operational amplifier 64 generates an output voltage corresponding to "Bv+Sv+a−Av."

Constant voltage source 66 generates an output voltage corresponding to the marginal flash synchronizable shutter speed, and comparator circuit 67 determines whether the shutter speed corresponding to the voltage generated from operational amplifier 64 is synchronizable or not. Shutter speed selecting circuit 68 outputs the output voltage of operational amplifier 64 via terminal 6a when the output voltage from operational amplifier 64 corresponds to a flash synchronizable shutter speed. When the output voltage from operational amplifier 64 corresponds to a shutter speed which is higher or shorter than the synchronizable shutter speed, shutter speed selecting circuit 68 outputs the voltage from constant voltage source 66 that corresponds to the shutter speed Tv3 to be controlled.

The circuit construction of the third programmed exposure control circuit 7 is almost the same as that of the second programmed exposure control circuit 6 shown in FIG. 3 except for the following point, and a detailed description of circuit 7 is therefore omitted. That is, only constant voltage source 53 in FIG. 3 may by modified to generate a voltage corresponding to the minimum flash light amount GNmin for the flash device in use instead of the voltage corresponding to the mimimum flash light amount GN max of the same.

Figure 4:
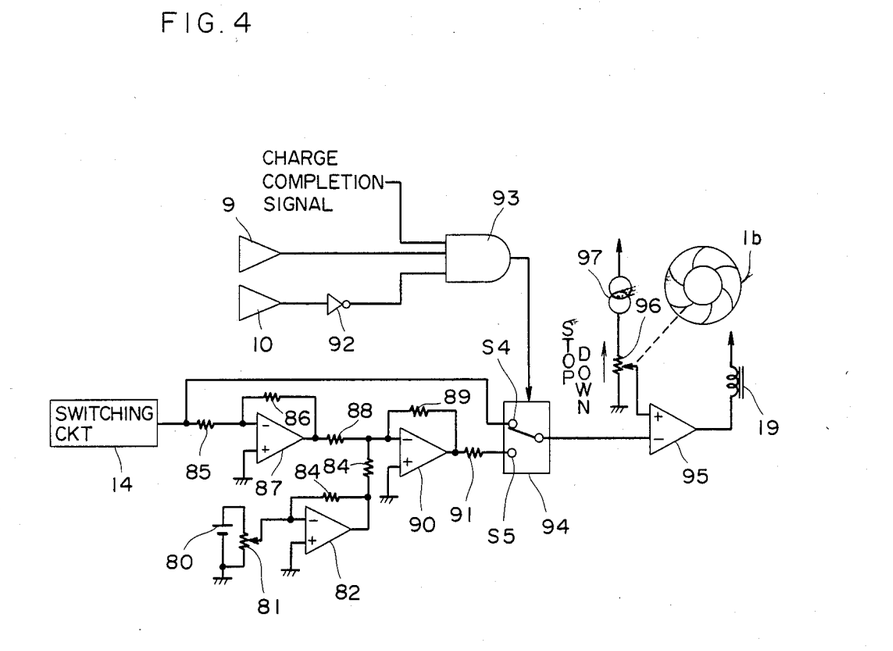
FIG. 4 is a circuit diagram showing an example of the diaphragm aperture control circuit of the embodiment.

FIG. 4 is a circuit diagram of an example of diaphragm control circuit 16. In addition to the primary diaphragm control section, the circuit of FIG. 4 is equipped with a diaphragm correcting section which serves to change the controlled diaphragm aperture value to a smaller aperture value as much as an extra a steps only when the aperture value Av2 determined at the first programmed exposure control circuit 5 is selected by the first shutter speed selecting circuit 11, namely, when Avmax>Av2>Avmin. First, a description is given for the construction and operation of the diaphragm correcting section. The circuit comprising constant voltage source 80 and potentiometer 81 generates a voltage corresponding to the above a steps. Calculation is performed with that voltage and a voltage corresponding to the diaphragm aperture value Av and generated from the second diaphragm aperture selecting circuit 14 by resistors 83, 84, 85, 86, 88, 89 and 91, and operational amplifiers 82, 87 and 90, so that a voltage corresponding to "Av+a" will be applied to one input terminal S5 of third diaphragm aperture value selecting circuit 94. Also, a voltage corresponding to the diaphragm aperture value Av and generated from the above second diaphragm aperture selecting circuit 14 is directly input to the other input terminal S4 of third diaphragm aperture value selecting circuit 94. Further, AND circuit 93 receives the output from first comparator circuit 9, the output of second comparator circuit 10 via inverter 92 and the charge completion signal. The output of AND circuit 93 supplied as a changeover control signal to third diaphragm aperture value selecting circuit 94. Third diaphragm aperture value selecting circuit 94 is controlled to generate the signal "Av+a" to the input terminal S5 only when an "H" level signal is generated from AND circuit 93 (namely, when the diaphragm aperture value is between Avmax and Avmin, and when the camera is set to the flash photography mode), and to generate the signal "Av" to input terminal S4 when an "L" level signal is generated. Next, the diaphragm controlling section comprises a diaphragm aperture value signal generating circuit including a potentiometer 96 having a slider which moves in response to the stopping-down operation of objective lens diaphragm 1b. The diaphragm aperture value generating circuit further includes a constant current source 97. The diaphragm controlling section further comprises comparator 95 which compares the voltage at the slider of pontentiometer 96 with the voltage supplied from third diaphragm aperture value selecting circuit 94. When the voltage from potentiometer 96 which increases with the stopping-down operation, reaches the level of voltage applied from the third diaphragm aperture value electing circuit 94, comparator 99 determines that the diaphragm 1b of the lens has attained the diaphragm aperture value to be controlled, and generates an "H" level signal to interrupt the power supply to shutter closing electromagnet 19 to stop the stopping-down operation.

The operation of the camera according to the present invention will now be explained briefly for the case of a flash photography. First, when the camera is operated in the natural light photography mode with the flash device not being used, the first combination of a diaphragm aperture value Av and a shutter speed Tv1 for obtaining an optimum exposure is determined in accordance with the ambient light level by known natural light programmed photography exposure control circuit 8 of which operation was not explained in the above description. Since no charge-completion signal is generated at this time, selecting circuits 13 and 14 are switched respectively to the contacts as shown by the dotted lines in FIG. 1, and the camera is controlled to the above diapragm aperture value Av1 and the shutter speed Tv1 so that an optimum exposure can be obtained. Next, when a photograph is taken with a flash device, first programmed exposure control circuit 5 determines, in accordance with the ambient light level, a second combination of a diapragm aperture value Av2 and a flash synchronizable shutter speed Tv2 for obtaining an optimum exposure.

Also, second programmed exposure control circuit 6 generates an output signal corresponding to a third combination of the maximum diaphragm aperture valve Avmax and a flash synchronizable shutter speed Tv3. The aperture value Avmax is determined in accordance with the data of an object distance from range finding circuit 4 and the maximum flash light amount of the flash device in use. The shutter speed Tv3 is determined in accordance with the maximum diaphragm aperture value Avmax and the ambient light level to provide an exposure level lower by a steps from the optimum exposure presenting level. Third programmed exposure control circuit 7 generates an output signal corresponding to a fourth combination of the minimum and a flash synchronizable shutter speed Tv4. The minimum diaphragm aperture value Avmin is determined in accordance with the above mentioned object distance and the minimum flash light amount of the flash device in use. The shutter speed Tv4 is determined in accordance with the minimum diaphragm aperture value and the above mentioned ambient light to provide an exposure level a steps lower than the optimum exposure level.

The diaphragm aperture value signal generated from flash photography programmed exposure control circuits 5, 6 and 7 are compared by comparator circuits 9 and 10 as to whether the Av2 is between Avmax and Avmin. In accordance with those comparisons, selecting circuits 11 and 13 are controlled to select the second combination "Av2 and Tv2" when Avmax>Av2>Avmin, the third combination "Avmax and TV3" when Av2>Avmax, and the fourth combination "Avmin and Tv4" when Av2>Avmin, respectively. When the charging of main capacitor in the flash device has not been completed, the first combination "Av1 and Tv1" is selected irrespective of the above selected combinations. When the charging has been completed, selecting circuits 13 and 14 are switched to the positions shown by the real line to select the above selected combinations.

Emitted flash light amount control circuit 17 transmits to the flash device, data of the emitted flash light amount that is determined in accordance with the diaphragm aperture value signal from diaphragm aperture selecting circuit 14 and the object distance signal from range finder circuit 4 to obtain an optimun exposure. The flash device controls the amount of the flash light in accordance with such data so that an optimum exposure is given for the principal target object. On the other hand, shutter speed control circuit 15 and diaphragm control circuit 16 are used for controlling the exposure level for the surroundings of the principal target object, and operate to provide an exposure level that is lower by a steps than the optimum exposure level. Namely, as the second combination "Av2 and Tv2" is a combination which provides an optimum exposure level, the diaphragm aperture value Av2 is corrected to "Av2+a" by the diaphragm correcting section, resulting in an "under" exposure. The fourth combination "Avmin and Tv4" provides an "under" exposure since the shutter speed Tv3 has already included the correction to "under" exposure by a steps. Thus, in flash photography, the camera operates to provide an "under" exposure level for the surroundings of the principal target object.

It should be noted that the diaphragm aperture is corrected when "Avmax>Av2>Avmin because most of daylight photography i.e. flash photography under daylight conditions is made for such scenes. If the shutter speed is corrected to a higher one, "under" exposure is attained. However the shutter speed can only be adjusted within the range of the flash synchronizable shutter speeds. If such a problem may be disregarded, the "under" exposure value may be incorporated beforehand in the value Tv2 in the case of the second combination. In the above case, the diaphragm correcting section in diaphragm control circuit 16 will become unnecessary.

In the above mentioned embodiment, the amount of flash light for providing an optimum exposure level to a principal target object is controlled in such a manner that, a light amount determined in accordance with an object distance and a diaphragm aperture value given as a function of the ambient light level and the light amount emitted from a flash tube is controlled to the determined light amount. The flash light amount may be controlled in a manner such that the the object light is detected through the diaphragm aperture of the camera objective (so called TTL light measuring) and that the flash firing is stopped when the integration of the detected light reaches a proper exposure level. A description will now be given of an example of such embodiments with reference to the following drawing.

Figure 5:
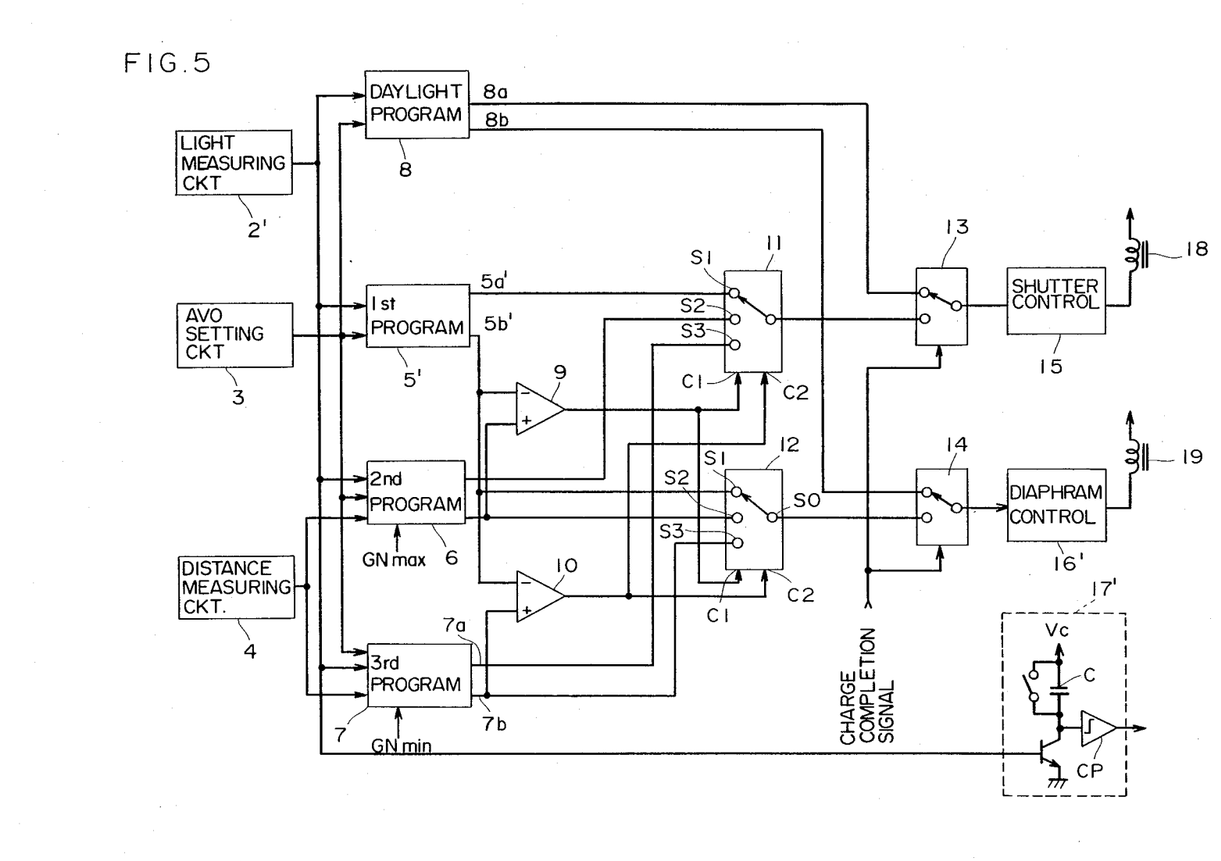
FIG. 5 is a block diagram showing another embodiment of the present invention.
Figure 6:
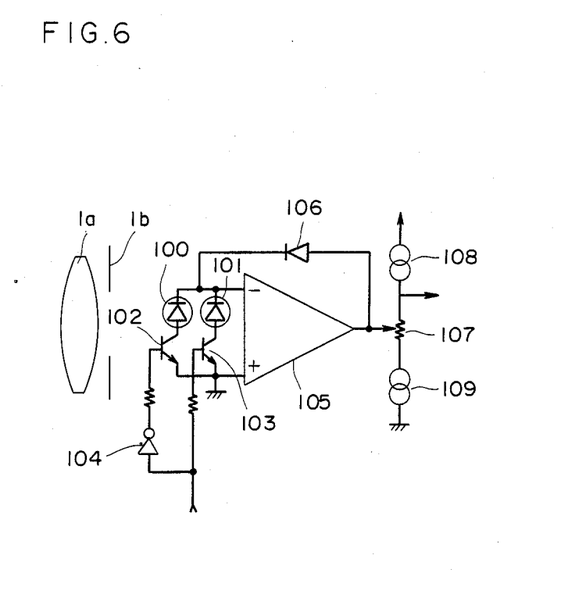
FIG. 6 is a circuit diagram showing an example of the light measuring circuit 2' of the embodiment.
Figure 7:
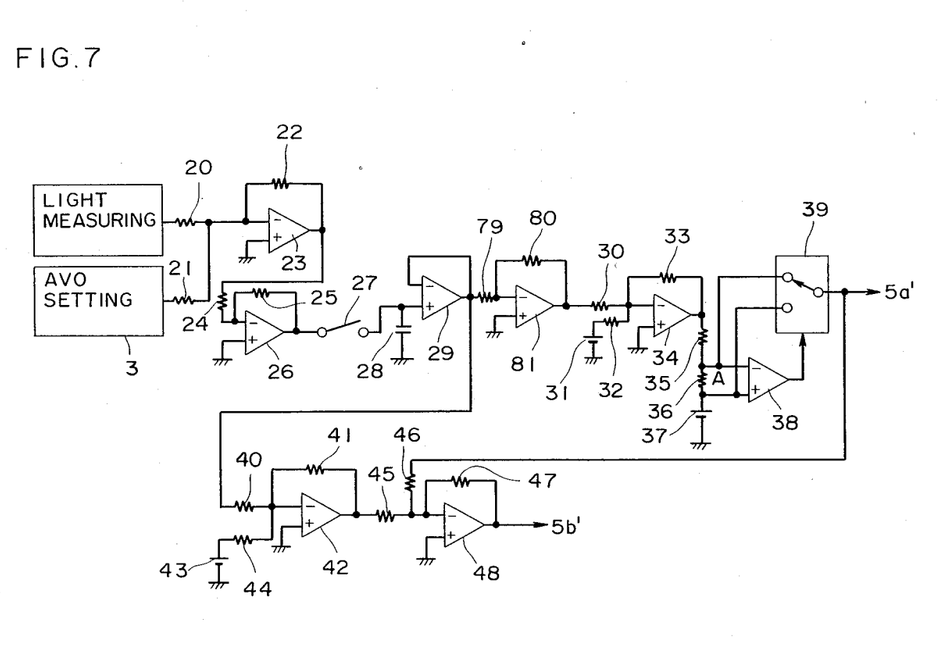
FIG. 7 is a circuit diagram showing an example of the first programmed exposure control circuit 5.

FIG. 5 is a block diagram showing the construction of another embodiment of the present invention. It is to be noted that the same reference characters are used for the elements having the same construction as those shown in FIG. 1 and a detailed description thereof is hereby omitted. Light measuring circuit 2' has a construction as shown in FIG. 6, and comprises light detectors 100 and 101. Light detector 100 receives the light coming from the object to be photographed and passing through the diaphragm aperture of the lens and measures the light from substantially the entire portion of the scene to be photographed to evaluate the light condition of the surroundings of the principal target object. Light detector 101 performs a narrow angle or spot light measurement and measures the light from a specific area (for example, the center portion) of the scene to be photographed such that the light from a portion of the principal target object is measured. Those light detectors are both connected between input terminals of operational amplifier 105 via transistors 102 and 103 respectively. However each of the light measurement outputs from those detectors is input to operational amplifier 105 at different times. Namely, the conduction and non-conduction of those transistors are controlled by a stopping-down starting signal such that transistor 102 is made conductive via inverter 104 before the start of the stopping down of diaphragm 1b, to input to operational amplifier data of the light of the surrounding of the principal target object, and such that transistor 103 is made conductive after the start of the stopping down of the diaphragm to input to the amplifier data of the light of the principle target object. Those light measurements are converted by diode 106 to voltages representing "Bv−Av". A voltage representing a field sensitivity is added to the converted voltage by potentiometer 107 and constant current sources 108 and 109, to produce a voltage representing "Bv+Sv−Av". First programmed exposure control circuit 5' has a circuit construction as shown in FIG. 7 such that a circuit consisting of constant voltage source 43 and a resistor 44 is added to the input circuit of operational amplifier 43.

A voltage corresponding to an "under" exposure value of a steps as described earlier is given by constant voltage source 43, and from output terminal 5a' is generated an output voltage corresponding to "Av+a". It is to be noted that from output terminal 5b' is generated a voltage corresponding to Tv2 as in FIG. 2. As a result, the first programmed exposure control circuit 5' generates an output signal representative of a combination of a diaphragm aperture value and a shutter speed that provides an exposure level a-steps below the optimum exposure level. The diaphragm correcting section as shown in FIG. 4 is not installed in diaphragm control circuit 16'. Circuit 17' for controlling the amount of light emitted from a flash tube may be a known circuit which receives light measurement output from light measuring circuit 2' and generates an output signal for stopping the flash light when the integration of the light measurement reaches a prescribed value.

With the circuit construction so far described, upon flash photography both shutter speed control circuit 15 and diaphragm control circuit 16' operate in accordance with the shutter speed and diaphragm aperture value selected by the respective selecting circuits 13 and 14 to provide an exposure that is a-steps below the optimum exposure level, for the surroundings of the principal target object. On the other hand, the flash device is controlled by its emitted light by the TTL light measurement so that an optimum exposure is given for the principal target object.

A list of reference characters in the drawings

1: photocell
1a: camera objective lens
1b: diaphragm
2,2': light measuring circuits
3: full aperture value setting circuit
4: range finding circuit
5,5': first programmed flash photography exposure control circuits
5a,5a': output terminals
5b,5b': output terminals
6: second programmed flash photography exposure control circuit
6a: ourput terminal
6b: output terminal
7: third programmed flash photography exposure control circuit
7a: output terminal
7b: output terminal
8: programmed natural light photography exposure control circuit
8a output terminal
8b: output terminal
9: first comparator circuit
10: second comparator circuit
11: first shutter speed selecting circuit
S$_1$,S$_2$,S$_3$: input terminals
S$_0$: output terminal
C$_1$,C$_2$: control terminals
12: first diaphragm aperture selecting circuit
13: second shutter speed selecting circuit
14: second diaphragm aperture selecting circuit
15: shutter speed control circuit
16,16': diaphragm control circuits
17,17': circuits for controlling the amount of light emitted from a flash tube
18: shutter closing electromagnet
19: diaphragm control electromagnet
20,21,22: resistors
23: operational amplifier
24,25: resistors
26: operational amplifier
27: switch
28: storage capacitor
29: buffer circuit
30,32,33: resistors 31: constant voltage source
34: operational amplifier
35,36: resistors
37: constant voltage source
38: comparator circuit
39: shutter speed selecting circuit
40,41: resistors
42: operational amplifier
45,46,47: resistors
48: operational amplifier
49,50: resistors
51: operational amplifier
52: resistor
53: constant voltage source
54,55: resistors
56: operational amplifier
57: resistor
58,61,62: resistors
59: operational amplifier
60: constant voltage source
63: resistor
64: operational amplifier
65: resistor
66: constant voltage source
67: comparator circuit
68: shutter speed selecting circuit
69,70,71: resistors
72: operational amplifier
73,74: resistors
75: operational amplifier
76: storage switch
77: storage switch
78: operational amplifier
79: resistor
80: constant voltage source
81: potentiometer
82,87,90: operational amplifiers
83,84,85,86,88,89,91: resistors
92: inverter
93: AND circuit
94: diaphragm aperture value selecting circuit
S5,S4: input terminals
95: comparator
96: potentiometer
97: constant current
100,101: light detectors
102,103: transistors
104: inverter
105: operational amplifier
106: diode
107: potentiometer
108,109: constant voltage source

I claim:

1. An exposure control device for a camera comprising:
a light measuring means for generating a light measurement output as a function of the brightness of a scene to be photographed;
a program signal means for generating signals representative of shutter speed and diaphragm aperture value for flash photography in accordance with the light measurement outputs;
a range finding means for generating a distance signal corresponding to the distance between the camera and a target object;
a marginal exposure signal means for generating signals representative of a shutter speed and a diaphragm aperture value in compliance with the distance signal, the light measurement output, and marginal light amount to be emitted from the flash device in use;
a comparing means for comparing the diaphragm aperture value signals from said program signal means and said marginal exposure signal means;
a selecting means for selecting the shutter speed and diaphragm aperture value signals from those from said program signal means and said marginal exposure signal means, in accordance with the output of said comparing means; and
an exposure control means for controlling the shutter speed and diaphragm of the camera in accordance with the signals selected by said selecting means.

2. An exposure control device as claimed in claim 1 wherein said marginal exposure signal means includes a maximum marginal exposure signal means for generating signals representative of a shutter speed and a diaphragm aperture value in compliance with said distance signal, said light measurement signal and the maximum amount of light to be emitted from a flash device in use; and a minimum marginal exposure signal means for generating signals representative of a shutter speed and a diaphragm aperture value in compliance with said distance signal, said light meaurement signal and the minimum amount of light to be emitted from the flash device in use; and said comparing means comparing the signals from said programmed signal means, and said maximum and minimum exposure signal means and said selecting means selects respective shutter speed and diaphragm aperture value signals from the compared signals.

3. An exposure control device as claimed in claim 1 wherein said light measuring circuit includes a light detector for receiving light coming from the target object and passing through the camera objective lens and the diaphragm aperture while the camera shutter is in operation, and said exposure control means includes an integrating means for integrating the light measurement outputs as a function of the amount of light received by said light detector, and means for generating a flash light stopping signal in accordance with the value of the integration.

4. An exposure control device as claimed in claim 1 further comprising a second programmed signal means for generating signals representative of a shutter speed and diaphragm aperture value for daylight photography in accordance with the light measurement outputs, and a second selecting means for selecting, depending upon whether a control signal is input from the flash device or not, one of the signals from said second programmed signal means and the signal selected by said selecting circuit.

* * * * *